US010827027B2

(12) United States Patent
Yeager et al.

(10) Patent No.: US 10,827,027 B2
(45) Date of Patent: Nov. 3, 2020

(54) PEER CACHE FILLING

(71) Applicant: Verizon Digital Media Services Inc., Dulles, VA (US)

(72) Inventors: Donnevan Scott Yeager, Anderson Island, WA (US); Derek Shiell, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 16/511,147

(22) Filed: Jul. 15, 2019

(65) Prior Publication Data

US 2019/0342420 A1 Nov. 7, 2019

Related U.S. Application Data (63) Continuation of application No. 15/237,112, filed on Aug. 15, 2016, now Pat. No. 10,362,134.

(51) Int. Cl.
*H04L 29/08* (2006.01)
*H04L 29/06* (2006.01)

(52) U.S. Cl.
CPC .......... *H04L 67/2842* (2013.01); *H04L 67/10* (2013.01); *H04L 67/1097* (2013.01); *H04L 67/22* (2013.01); *H04L 67/42* (2013.01); *H04L 69/22* (2013.01)

(58) Field of Classification Search
CPC ...... H04L 67/2842; H04L 67/10; H04L 67/42
See application file for complete search history.

(56) References Cited

U.S. PATENT DOCUMENTS

| 8,819,187 B1* | 8/2014 | Hofmann | H04L 67/2814 709/217 |
| 2002/0026560 A1* | 2/2002 | Jordan | G06F 9/505 711/120 |
| 2005/0262246 A1* | 11/2005 | Menon | H04N 21/23103 709/226 |
| 2006/0015574 A1* | 1/2006 | Seed | H04L 67/1095 709/219 |
| 2008/0162700 A1* | 7/2008 | Aborn | H04L 67/1008 709/226 |
| 2015/0074222 A1* | 3/2015 | Liang | H04L 67/2842 709/214 |

(Continued)

*Primary Examiner* — Nicholas R Taylor
*Assistant Examiner* — Sanjoy Roy
(74) *Attorney, Agent, or Firm* — Ansari Katiraei LLP; Arman Katiraei; Sadiq Ansari (57) ABSTRACT

The embodiments provide peer cache filling. The peer cache filling allocates a set of caching servers to distribute content in response to user requests with a limited first subset of the set of servers having access to retrieve the content from an origin and with a larger second subset of the set of servers retrieving the content from the first subset of servers without accessing the origin. The peer cache filling dynamically escalates and deescalates the allocation of the caching servers to the first and second subsets as demand for the content rises and falls. Peer cache filling is implemented by modifying request headers to identify designated hot content, provide a request identifier hash result for identifying the ordering of servers, and provide a value for designating which servers in the ordering as primary server with access to the origin.

20 Claims, 7 Drawing Sheets

(56) References Cited

U.S. PATENT DOCUMENTS

| | | | |
|---|---|---|---|
| 2015/0149580 A1* | 5/2015 | Reeser | G06F 17/30902 709/213 |
| 2016/0164964 A1* | 6/2016 | Yeager | H04L 67/1023 709/226 |

* cited by examiner

PEER CACHE FILLING

CLAIM OF BENEFIT TO RELATED APPLICATIONS

This application is a continuation of U.S. nonprovisional application Ser. No. 15/237,112 entitled "Peer Cache Filling", filed Aug. 15, 2016, now U.S. Pat. No. 10,362,134. The contents of application Ser. No. 15/237,112 are hereby incorporated by reference.

BACKGROUND ART

A content delivery network (CDN) is a distributed platform that delivers customer (i.e., content provider) content to different end users from different distribution points within a digital network. The CDN operates different points-of-present (PoPs) throughout the digital network which form the content distribution points. One or more CDN caching servers operate in each of the PoPs. The CDN caching servers cache and serve the customer content on behalf of the CDN customers. The CDN effectively fans out the customer content from the customer origin to a larger set of CDN caching servers. The larger set of CDN caching servers then redistributes the customer content to an even larger set of end users while optimizing the delivery by localizing the distribution points from which end users receive the content from the CDN. The customer origin has minimal distribution capacity relative to the collective distribution capacity of the CDN as provided by the numerous CDN caching servers. The customer origin is typically formed from one or more origin servers that are under the customer or content provider control with the origin servers being the point of origin for the customer content.

The CDN distribution model shields the customer origin from the high volume of end user requests requesting the customer content. Nonetheless, the CDN imposes its own load on the customer origin servers. In particular, the CDN caching servers make at least one access to the customer origin servers in order to obtain and cache copies of the original customer content that are then redistributed in response to the end user requests.

To reduce the load that the CDN caching servers impose on the customer origin, the CDN typically designates one or more caching servers from a larger number of caching servers within each PoP to cache and distribute content of different customers. Persistent request distribution ensures that end user requests for particular customer content received at a CDN PoP are directed to the same one or more caching servers within the PoP that are designated to distribute that particular customer content.

However, there are cases when demand for particular content spikes and the request rate (i.e., number of request for particular content over an interval) or the byte rate (i.e., bytes per second) for the particular content surpasses one or more "hot" thresholds. In such cases, the CDN dynamically allocates additional caching servers within the PoPs to handle the increased load and have more resources dedicated to caching and distributing the hot content.

The problem with this dynamic allocation of additional caching servers to handle hot content is that each newly allocated caching server imposes additional load on the customer origin server. Each newly allocated caching server performs at least one request to and retrieval from the origin server in order to obtain its own copy of the hot content for redistribution. For example, if each of 20 PoPs dynamically allocate 10 caching servers to serve hot content of a particular customer, then 200 CDN caching servers may contemporaneously request the same content from the same customer origin. This spike in traffic to the customer origin occurs when streaming popular live, linear, or programmed events, serving content related to a trending topic, program, or news, or because of temporal spikes that occur on certain holidays or at certain times of the day as some examples.

For sufficiently hot content, the demand from the dynamically allocated caching servers from different CDN PoPs can overwhelm the customer origin. This problem is exacerbated when the customer content is regularly updated and can only be cached for a short period of time, or contains dynamic elements that require retrieval from the customer origin for each request, for each new session, or for each new user. The dynamic hot content scaling performed by the CDN can effectively undo the request shielding that the CDN is supposed to provide to the customer origin.

There is therefore a need to shield the customer origin even when customer content becomes hot and the CDN or other distributed platform allocates additional servers or resources to meet end user demand. In particular, there is a need to enable the dynamically allocated servers to efficiently pre-fetch or retrieve in real-time the hot content that originates from the customer origin servers while simultaneously reducing or eliminating the load the dynamically allocated servers impose on the customer origin servers. In other words, there is a need for the CDN to dynamically scale to allocate additional resources to satisfy high demand for hot content while maintaining a shield protecting the customer origin from excess load.

BRIEF DESCRIPTION OF THE DRAWINGS

A preferred embodiment of methods and systems for peer cache filling will now be described, by way of example only, with reference to the accompanying drawings in which.

DETAILED DESCRIPTION

Peer cache filling methodologies and systems are set forth herein. The peer cache filling propagates content from a customer origin across a tier of caching servers without accessing the customer origin with each caching server from the tier of caching servers. Instead, the peer cache filling dynamically provides a subset of the tier of caching servers with access to the customer origin. The subset of caching servers cache fills directly from the customer origin. Each caching server from the subset of caching servers then becomes a primary server from which the other caching servers in the tier of caching servers can fill their cache without additional access to the customer origin. Stated differently, the peer cache filling dynamically allocates and assigns servers within the tier of caching servers so that a specific first subset of the caching servers retrieves hot content from the customer origin servers while a different second subset of the caching servers retrieves the hot content from the first subset of caching servers without further access to the customer origin servers.

The peer cache filling effectively and dynamically reorganizes the tier of caching servers to allow for the inter-tier retrieval of the content as the "hotness" of the content grows. The peer cache filling dynamically adapts to increase and decrease the allocation and assignment of different caching servers to the different subsets in real-time as content hotness peaks and ebbs. In particular, the peer cache filling scales to designate additional primary servers as the content hotness grows and additional caching servers as needed to handle the demand. For instance, five hot allocated caching servers peer cache fill from one primary server when there is a first rate of requests that exceed a first hotness threshold, ten hot allocated caching servers peer cache fill from two primary servers when there is a second rate of requests that exceed a second hotness threshold, etc.

In summary, the peer cache filling supports the dynamic allocation of hot allocated caching servers to scale resources to satisfy a large volume of end user requests. The peer cache filling further supports the dynamic scaling of the primary servers (i.e., servers with access to cache fill directly from the customer origin). The dynamic scaling of the primary servers protects the primary servers from a large volume of requests from the other hot allocated caching servers peer cache filling from the primary servers, while the primary servers protect the customer origin server from receiving a large volume of requests from the CDN.

Hotness refers to a current or aggregate demand for particular content. The hotness or demand is determined based on the number of requests for the particular content over a specified time interval. The number of requests can be the aggregate request count received by an individual server or by a set of servers, such as servers collocated in one point-of-presence (PoP) of a content delivery network (CDN) or globally across all caching servers in different PoPs of the CDN. Alternatively, the servers, PoP, or CDN can determine demand based on the byte rate for the particular content. In some embodiments, the byte rate is the bytes per second for the particular content at a server, PoP, or CDN.

Accordingly, thresholds defined according to a request rate or byte rate can be set at a server, PoP, or CDN to define content hotness. For instance, a first threshold can define X number of requests per second for first content as the baseline for differentiating the first content as hot content, and a second threshold can define Y as the total megabits of second content per second as the baseline for differentiating the second content as hot content.

In some embodiments, the same thresholds also control the scaling or allocation of additional primary servers or caching servers for hot content. In some such embodiments, the number of servers from a PoP that is dynamically allocated to serve particular hot content is determined from dividing the total requests per second for the particular hot content at the PoP by the request per second threshold. For example, in response to receiving fifteen requests for particular content per second at a CDN PoP and a threshold set at five requests per second, the CDN PoP dynamically allocates three servers to serve the particular content. In response to the request rate at the CDN PoP increasing to twenty three requests per second, the CDN PoP allocates another two servers for a total of five servers to serve the particular content. In this manner, a single threshold can define different multiple hotness levels for the particular content. Similarly, some embodiments dynamically allocate servers to serve particular hot content by dividing the total megabits per second of particular content by the megabits per second threshold.

Hotness is a configurable and tunable measure. A lower threshold may be used to differentiate large content (e.g., content larger than one megabyte in size) as "hot" content, and a higher threshold may be used to differentiate small content (e.g., content smaller than one megabyte in size) as "hot" content.

In some other embodiments, hotness is defined hierarchically. For example, if at least a hundred requests for particular content are received within the specified time interval, then the particular content can be defined to have level one hotness; if at least a thousand requests for the particular content are received within the specified time interval, then the particular content can be defined to have level two hotness; and if at least ten thousand requests for the particular content are received within the specified time interval, then the particular content can be defined to have level three hotness. Any number of hotness hierarchical levels can be defined with any custom criteria such as average number of requests per second over a one minute interval, aggregate number of requests per five seconds, number of requests per region, etc.

In some such embodiments, the different hierarchical levels are tied to different numbers of servers that are dynamically allocated to serve particular hot content. For instance, a hotness level of one can correspond to allocating five servers in a PoP to collectively respond to the user requests for the particular hot content, a hotness level of two can correspond to allocating ten servers in a PoP to collectively respond to the user requests for the particular hot content, and a hotness level of three can correspond to allocating fifteen servers in a PoP to collectively respond to the user requests for the particular hot content.

The peer cache filling operation then reorganizes the dynamically allocated set of caching servers for inter-tier retrieval of particular hot content rather having each allocated caching server retrieve the particular hot content directly from the customer origin. For example, in response to allocating five servers from a PoP to serve particular hot content, the peer caching filling operation can designate one of the five servers as the primary server in the PoP to access the customer origin for retrieval of the particular hot content with the other four hot allocated servers accessing the primary server in order to obtain copies of the particular hot content. Continuing with this example, in response to allocating ten servers from a PoP to serve the particular hot content, the peer cache filling operation can designate two of the ten servers as primary servers in the PoP to access the customer origin for retrieval of the particular hot content with the other eight hot allocated servers accessing the two primary servers in order to obtain copies of the particular hot content.

The peer cache filling can execute on a CDN or any distributed platform operating multiple servers for the purpose of distributing third party content that originates from a third party origin site. The peer cache filling provides the CDN or distributed platform the ability to adaptively scale capacity to handle request spikes for hot content while minimally increasing loads placed on origin servers from which original copies of the hot content are disseminated to the CDN or distributed platform for redistribution to end users.

Figure 1:
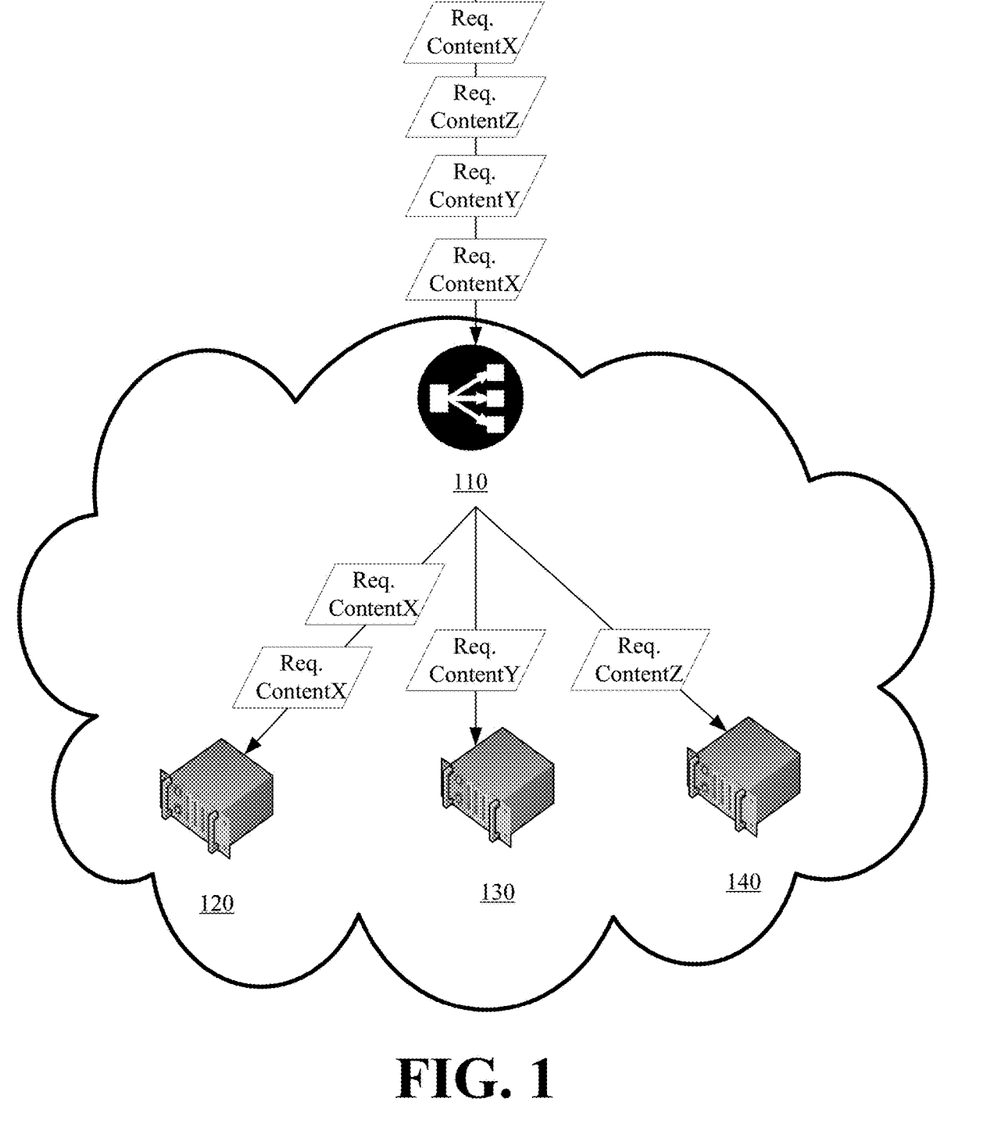
FIG. 1 presents an exemplary architecture for implementing peer cache filling in accordance with some embodiments.

FIG. 1 presents an exemplary architecture for implementing peer cache filling in accordance with some embodiments. The exemplary architecture is representative of a CDN PoP. The exemplary architecture includes at least one front-end server 110 and multiple back-end servers 120, 130, and 140. The front-end server 110 receives user content requests and distributes the requests across the set of back-end servers 120, 130, and 140.

The front-end server 110 can be a load balancing device or other director. The request distribution performed by the front-end server 110 preferably involves a persistent distribution in which requests for the same content are distributed to the same back-end server. The persistent distribution causes the different back-end servers 120, 130, and 140 to cache and serve different subsets of content, thereby maximizing the total cache footprint by reducing the number of objects that are redundantly cached by two or more back-end servers. In some embodiments, the persistent distribution involves hashing a request Uniform Resource Identifier (URI) in order to select a back-end server from the set of back-end servers 120, 130, and 140 to respond to the request. In some embodiments, the front-end server 110 implements the Cache Array Routing Protocol (CARP) for a persistent distribution of requests.

By receiving the requests directed to any of the set of back-end servers 120, 130, and 140, the front-end server 110 is able to track request rates or byte rates. The front-end server 110 classifies content hotness based on these tracked rates. As will be demonstrated below, the front-end server 110 can also control the dynamic allocation and scaling of the back-end servers 120, 130, and 140 for peer cache filling in accordance with some embodiments. In some embodiments, a different front-end server instance can run in conjunction with each back-end server of the set of back-end servers 120, 130, and 140.

Each of the back-end servers 120, 130, and 140 responds to a received user request by serving requested content in return. Each of the back-end servers 120, 130, and 140 comprises a cache or memory. The cache or memory is local storage in which copies of customer content can be stored so that the back-end server can distribute copies of the same content to different users without having to retrieve a fresh copy from an origin or primary server in response to each request.

Figure 2:
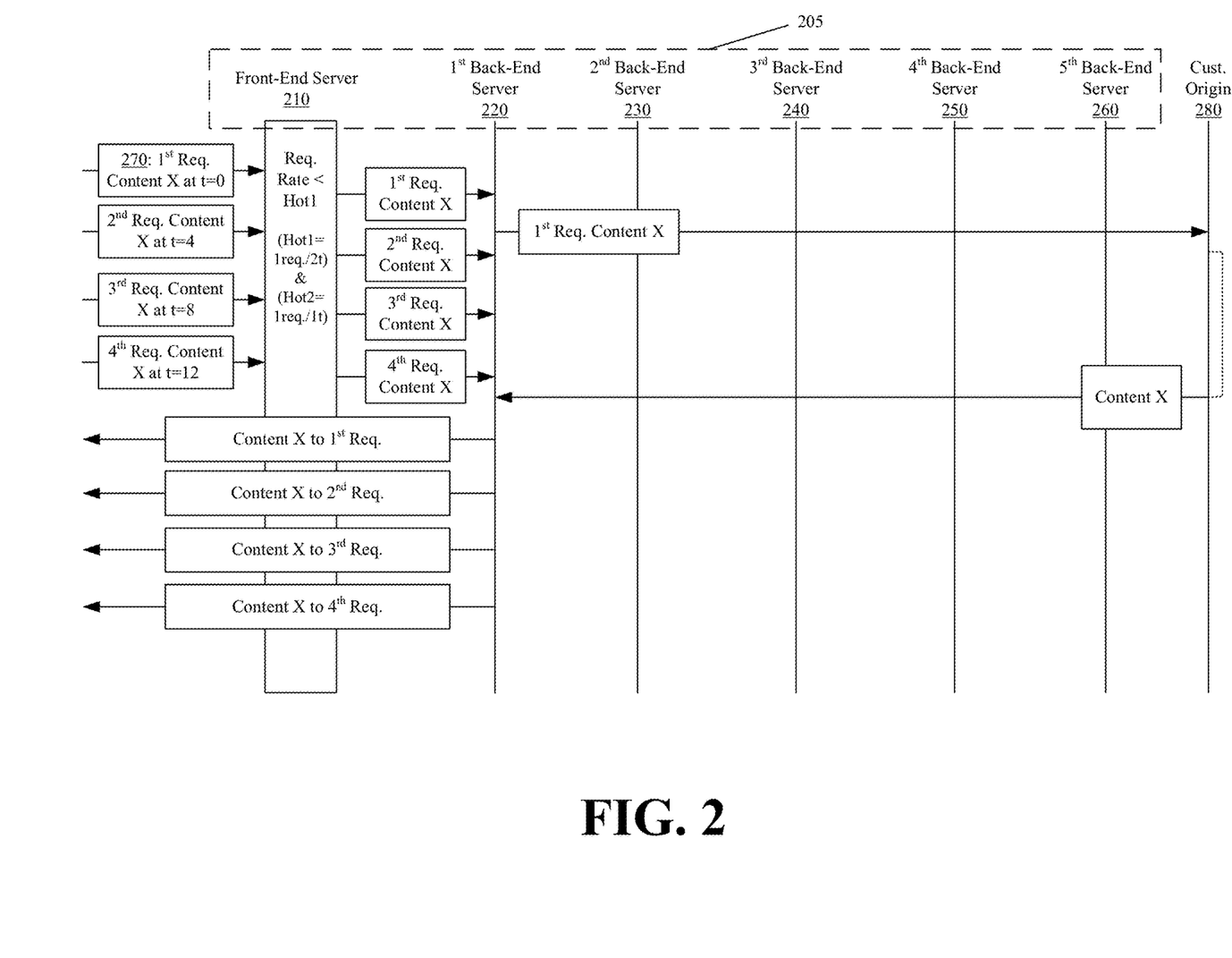
FIGS. 2-4 illustrate the peer cache filling operation as content becomes increasingly hot in accordance with some embodiments.
Figure 3:
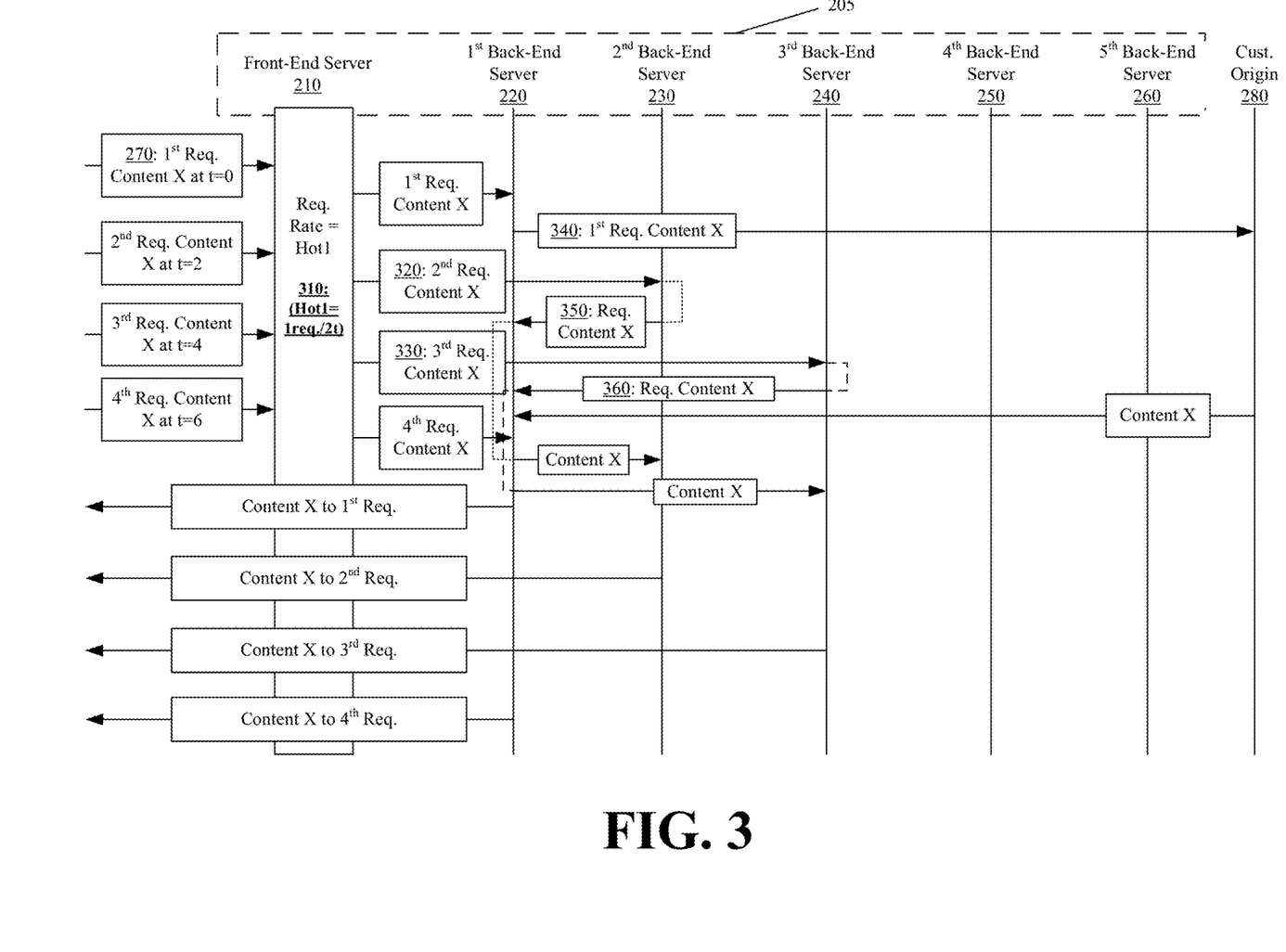
Figure 4:
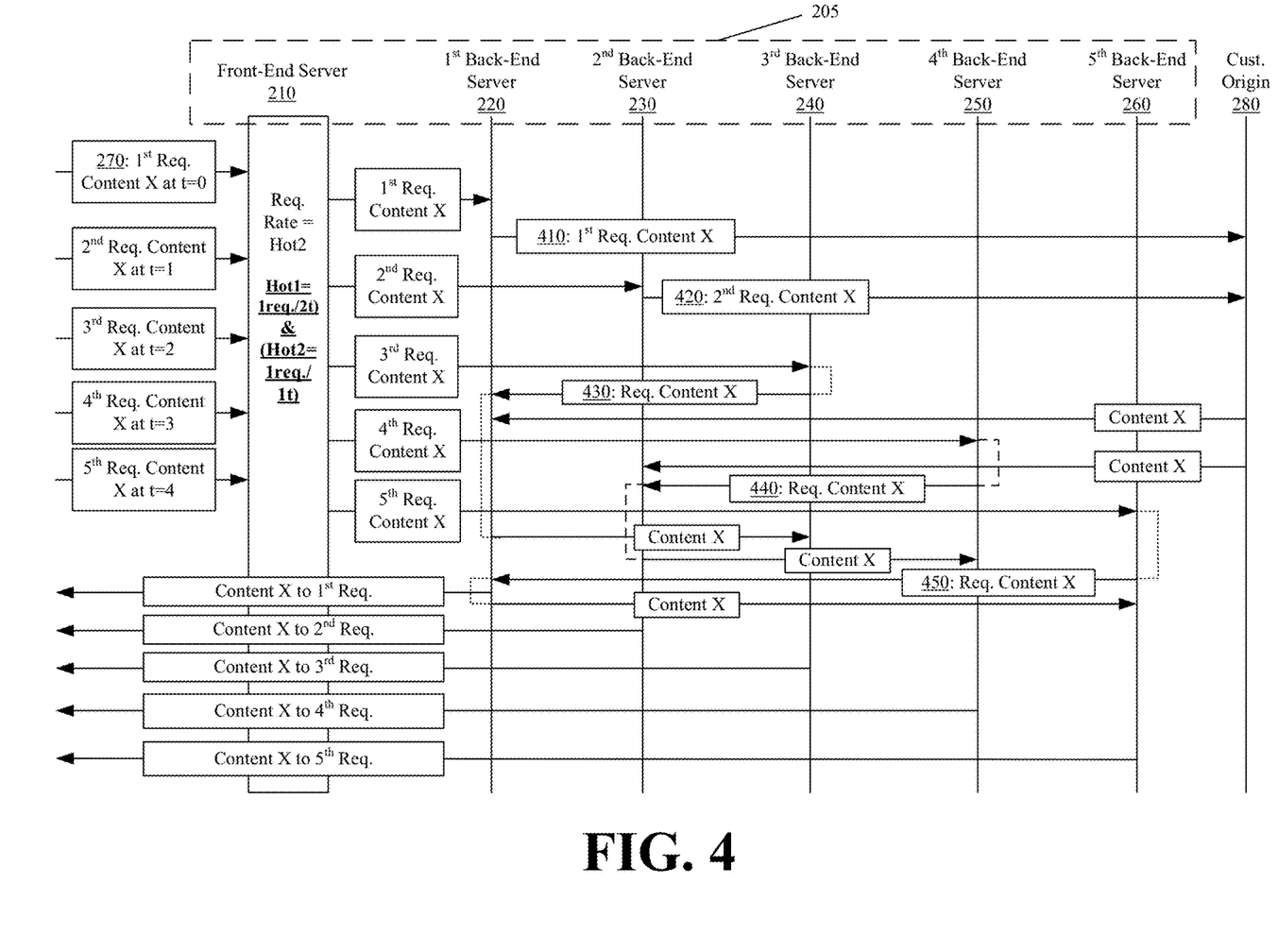

FIGS. 2-4 illustrate the peer cache filling operation as content becomes increasingly hot in accordance with some embodiments. More specifically, FIGS. 2-4 illustrate operation of a front-end server 210 and different back-end servers 220, 230, 240, 250, and 260 of the PoP 205 at three different stages corresponding to rising hotness of particular content.

In the initial stage illustrated by FIG. 2, the prior and current rate of requests for the particular content at the PoP 205 is less than the request rate for initiating peer cache filling. Accordingly, the front-end server 210 does not classify the particular content as hot content. The front-end server 210 performs a hash of each request to select a first back-end server 220 as a primary server to receive and respond to all requests for the particular content. In response to a first request 270 for the particular content, the first back-end server 220 retrieves an original copy of the particular content from the appropriate customer origin 280. The first back-end server 220 caches the retrieved copy of the particular content and uses the cached copy to respond to subsequent requests for the particular content.

At the second stage illustrated by FIG. 3, the prior and current rate of requests for the particular content at the PoP 205 exceeds the defined hotness threshold by a first amount, thereby satisfying a first hotness level 310. The front-end server 210 classifies the particular content as hot content which triggers the peer cache filling in accordance with some embodiments. As a result, the front-end server 210 modifies its request distribution scheme to select between the first back-end server 220, a second back-end server 230, and a third back-end server 240 to receive and respond to the requests for the particular content. Therefore, the first back-end server 220 receives the first and fourth requests for the particular content; the second back-end server 230 receives the second request for the particular content at 320; and the third back-end server 240 receives the third request for the particular content at 330. Modifying the request distribution scheme of the front-end server 210 is one means by which additional back-end servers are dynamically allocated to handle the increased demand for the particular content.

In some embodiments, the front-end server 210 dynamically selects additional back-end servers to respond to requests for the particular hot content. In some such embodiments, each back-end server is configured with a weight value. The selection of the back-end is then based in part on a hash of the back-end server names or identifiers, the back-end server weight values, and a hash of the request URI. The result produces an ordered listing of the available back-end servers with the front-end server 210 distributing requests across the top X back-end servers, wherein X is a positive integer value calculated by dividing the actual content request rate by the threshold request rate.

To further trigger the peer cache filling operation, the front-end server 210 modifies the request headers to instruct the back-end servers 230 and 240 to peer cache fill from the first back-end server 220. Since the first back-end server 220 is designated as the primary server for the particular content, the first back-end server retrieves a copy of the particular content directly from the customer origin 280 at 340. In response to the modified request header, the second back-end server 230 at 350 accesses the first back-end server 220, and not the customer origin 280, to retrieve a copy of the particular content in order to respond to the second request for the particular content. Similarly, the third back-end server 240 at 360 accesses the first back-end server 220, and not the customer origin 280, to retrieve a copy of the particular content in order to respond to the third request for the particular content.

In FIG. 3, the peer cache fill operation allows the first, second, and third back-end servers 220, 230, and 240 to obtain copies of the particular content with only the first back-end server 220 accessing the customer origin 280. In the event, the first back-end server 220 is unavailable or the particular content is not cached thereon, the second and third back-end servers 230 and 240 may delay for a configurable amount of time before requesting the particular content from the first back-end server 220 again. Alternatively, the second and third back-end servers 230 and 240 may retrieve the particular content from the customer origin 280 after one or more retrieval attempts from the first back-end server 220 fail.

At the third stage illustrated by FIG. 4, the rate of requests for the particular content at the PoP 205 exceeds the defined hotness threshold by a larger second amount, thereby satisfying first and second hotness levels. This then escalates the peer cache filling by dynamically allocating additional primary servers to retrieve the particular content from the origin, and by dynamically allocating additional caching servers to perform the peer cache filling and respond to user requests for the particular content.

As shown in FIG. 4, the peer cache filling escalation involves dynamically allocating the fourth and fifth back-end servers 250 and 260 from the PoP 205 to also receive and respond to requests for the particular content. More specifically, the front-end server 210 modifies its request distribution based on the increased hotness so that requests for the particular content are distributed across the first, second, third, fourth, and fifth back-end servers 220, 230, 240, 250, and 260.

The peer cache filling escalation further involves designating the second back-end server 230 as a second primary server that is authorized, along with the first back-end server 220, to retrieve the particular content directly from the customer origin 280. The first back-end server 220 retrieves the particular content from the customer origin 280 at 410 in response to the first request for the particular content forwarded by the front-end server 210 to the first back-end server 220, and the second back-end server 230 retrieves the particular content from the customer origin 280 at 420 in response to the second request for the particular content forwarded by the front-end server 210 to the second back-end server 230.

The third, fourth, and fifth back-end servers 240, 250, and 260 now have the option to cache fill the particular content from either the first back-end server 220 or the second back-end server 230. As shown, the third back-end server 240 cache fills the particular content from the first back-end server 220 at 430; the fourth back-end server 250 cache fills the particular content from the second back-end server 230 at 440; and the fifth back-end server 260 cache fills the particular content from the first back-end server 220 at 450. Thus, the peer cache fill operation allows the first, second, third, fourth, and fifth back-end servers 220, 230, 240, 250, and 260 to obtain copies of the particular content with just one access to the customer origin 280 made by the first back-end server 220 and a second access made by the second back-end server 230.

The benefits of the peer cache filling embodiments are best observed when the hot content involves dynamic or rapidly updated content. In such cases, each request or update of the particular content requires a new access to the customer origin. A live stream is a particular example that illustrates the benefits of the peer cache filling set forth herein. The live stream is encoded and served as short segments or chunks (e.g., a few seconds) of video and audio. The segments are continually updated on the customer origin. Without peer cache filling, each of the first, second, third, fourth, and fifth back-end servers would contemporaneously request the same segment from the customer origin. As more back-end servers and more PoPs are allocated to meet increasing demand, the load on the customer origin would grow linearly with respect to the allocation of additional back-end servers. However, with the peer cache filling embodiments set forth herein, accesses to the customer origin are limited to the designated primary servers, including the first and second back-end servers. The first and second back-end servers would then redistribute the customer origin retrieved content to the third, fourth, and fifth back-end servers with all five back-end servers also serving the retrieved content in response to end user requests.

It should be noted that the peer cache fill operation conducted between the primary servers and other back-end servers of the PoP has performance advantages in addition to reducing load on the customer origin. The back-end servers have very high speed connections with one another by virtue of being collocated in a PoP. In most cases, the peer cache fill occurs over a local area network (LAN) with very little distance, minimal number of network hops, and latency between the back-end servers. It is possible for the peer cache filling back-end servers to receive the hot content faster than if they were to access the customer origin. The reduced load on the customer origin as a result of the peer cache filling allows the customer origin to be more responsive to the designated primary servers than it otherwise would be if responding to all back-end servers. The primary servers then leverage the high speed connections with the other back-end servers to redistribute the hot content internally within the PoP. In other words, by reducing the load on the customer origin, the peer cache filling allows servers at all levels of the content distribution hierarchy to perform at an optimal level.

As the particular hot content demand scales down, the peer cache filling responds in kind. The number of back-end servers allocated to respond to requests for the particular hot content is reduced and the number of primary servers is also reduced. The de-escalation allows for a dynamic repurposing of resources, whereby back-end servers can be allocated to serve different hot content at different times.

Some embodiments implement peer cache filling through the introduction of three new custom header fields in the front-end to back-end server request exchange. In some embodiments, the new header fields include: 1) X-EC-Peer-Fill; 2) X-EC-CARP-Hash; and 3) X-EC-Hash-Override. The new header fields are specified as HyperText Transfer Protocol (HTTP) custom headers. The naming of the header fields is therefore irrelevant. In some embodiments, existing HTTP, Transmission Control Protocol (TCP), or other protocol layer header fields are repurposed to implement the peer cache filling.

The front-end server adds the X-EC-Peer-Fill header field to a request when the request is for hot content. The presence of this header field notifies the receiving back-end server that it is to cache fill from a peer (i.e., a designated primary back-end server) rather than the customer origin if the receiving back-end server does not have the requested content in cache and the receiving back-end server is not designated as a primary server for the requested content.

As noted above, the front-end server 210 dynamically selects a back-end server to receive and response to the request based in part on a hash of server names of the available back-end servers, the back-end server weight values, and a hash of the request URI. The result of the URI hash is inserted in the X-EC-CARP-Hash header field so that the receiving back-end server need not recompute the hash in determining the primary servers from which the back-end server may complete the peer cache fill operation.

The front-end server populates the X-EC-Hash-Override header field with a value representative of the number of available primary servers from which the receiving back-end server can peer cache fill from. The front-end server controls the peer cache fill scaling in part with the value provided for the X-EC-CARP-Hash header field. As will be described below, the receiving back-end server can use the X-EC-Peer-Fill header field with the X-EC-CARP-Hash header field to identify the designated peers for completing the peer cache fill operation.

Figure 5:
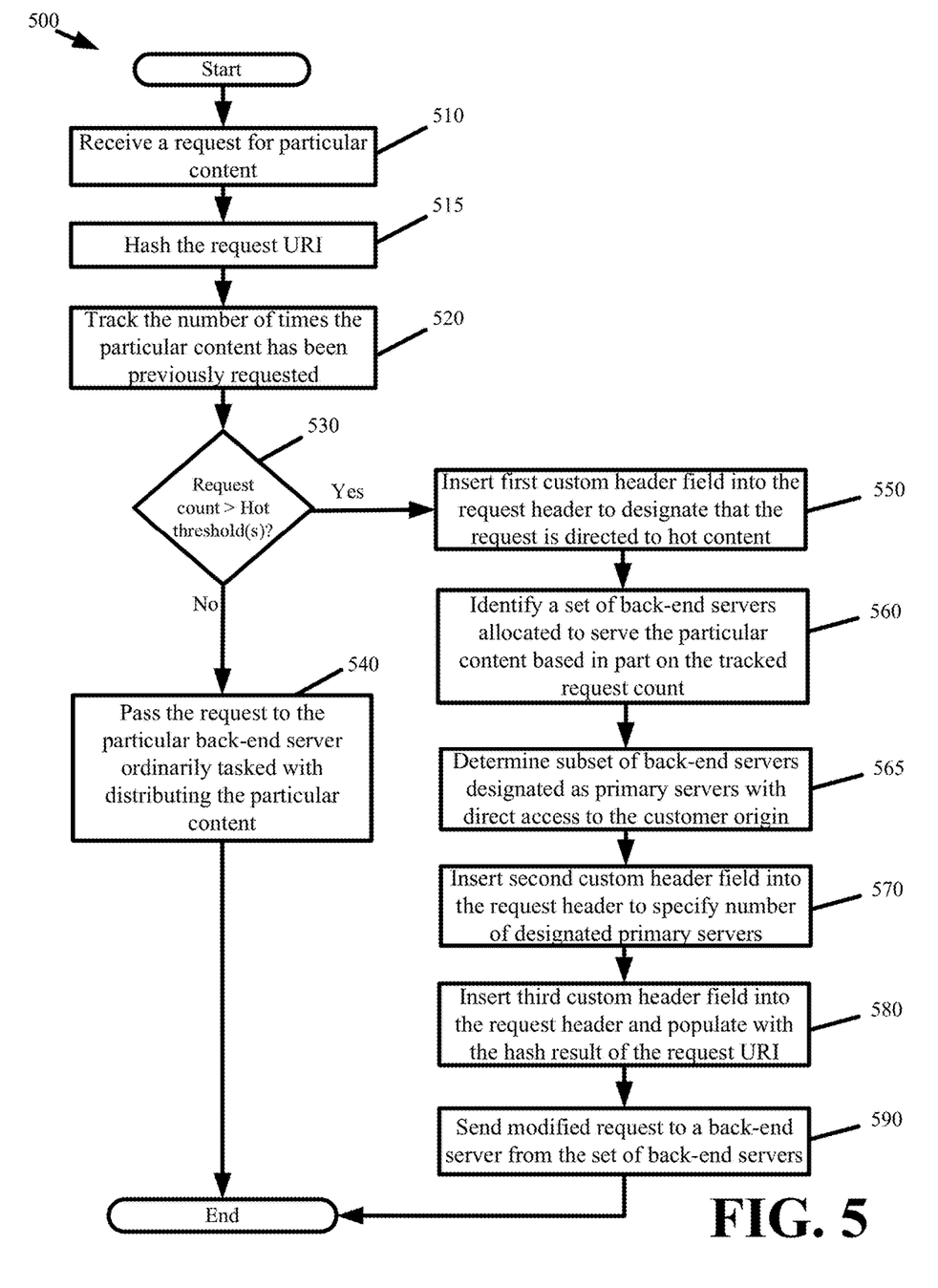
FIG. 5 presents a process for the peer cache fill operations performed by the front-end server in accordance with some embodiments.

FIG. 5 presents a process 500 for the peer cache fill operations performed by the front-end server in accordance with some embodiments. The process 500 commences when the front-end server receives (at 510) a request for particular content.

The process hashes (at 515) the request URI with the result of the hash having various uses described below. The process also tracks (at 520) the number of times the particular content has been previously requested or the byte rate for the particular content. In some embodiments, the tracking is limited to some interval. For example, the front-end server may track the number of times the particular content was requested during the last five minutes. As noted above, the front-end server tracks request rates or byte rates for different content. The front-end server may do so individually or collectively by sharing rate information with other front-end servers operating in the same PoP or a different PoP.

The process determines (at 530) if the tracked request count satisfies or exceeds one or more hotness thresholds. Based on the determination at 530, the process classifies the request as being directed to hot content or regular (not hot) content.

In response to the tracked request count for the particular content not exceeding a hotness threshold (i.e., not hot content), the process passes (at 540) the request to the particular back-end server that is ordinarily tasked with distributing the particular content. The particular back-end server is selected using the result of the URI hash, back-end server name hashes, and back-end server weight values. The result produces an ordering of the available back-end servers. The topmost back-end server in the ordering identifies the particular back-end server.

In response to the tracked request count for the particular content exceeding a hotness threshold, the process inserts (at 550) the X-EC-Peer-Fill header field into the request header to designate that the request is directed to hot content.

The process also relies on the tracked request count and the hotness threshold(s) to identify (at 560) the back-end servers that have been allocated to serve the particular content. As previously described, the tracked request count divided by the hotness threshold identifies some number of back-end servers from the top of the back-end server ordering as the back-end servers that have been allocated to serve the hot content. In some embodiments, the X-EC-Peer-Fill header field can be populated with the number of back-end servers that are currently allocated as hot servers for the particular content.

From the identified number of back-end servers allocated to serve the particular hot content, the process determines (at 565) the smaller number of back-end servers designated as primary servers with direct access to the customer origin. For example, if the hotness determination allocates the first three back-end servers in the ordered listing of available back-end servers to serve the hot content, then the first of the three back-end servers in the ordered listing is designated as the primary server, and if the hotness determination allocates the first six back-end servers in the ordered listing of available back-end servers to serve the hot content, then the first two of the six back-end servers in the ordered listing are designated as the primary servers. Administrators can specify a ratio or percentage of primary servers to the allocated back-end servers serving hot content. The process inserts (at 570) the X-EC-Hash-Override header field into the request header with a value corresponding to the number of back-end servers designated as primary servers (i.e., servers with access to the customer origin for direct retrieval of the particular content), wherein the X-EC-Hash-Override header field value is a positive integer value. The process also inserts (at 580) X-EC-CARP-Hash header field into the request header and populates the header field with the hash result computed at step 515.

The process sends (at 590) the modified request to a back-end server that is selected from the identified number of back-end servers allocated to serve the particular hot content. The selection of the back-end server can be based on a generated random number, wherein the random number is used to select one of the identified hot allocated back-end servers. Alternatively, the front server can perform a round-robin distribution or other distribution of requests for the particular content across the identified hot allocated back-end servers.

Figure 6:
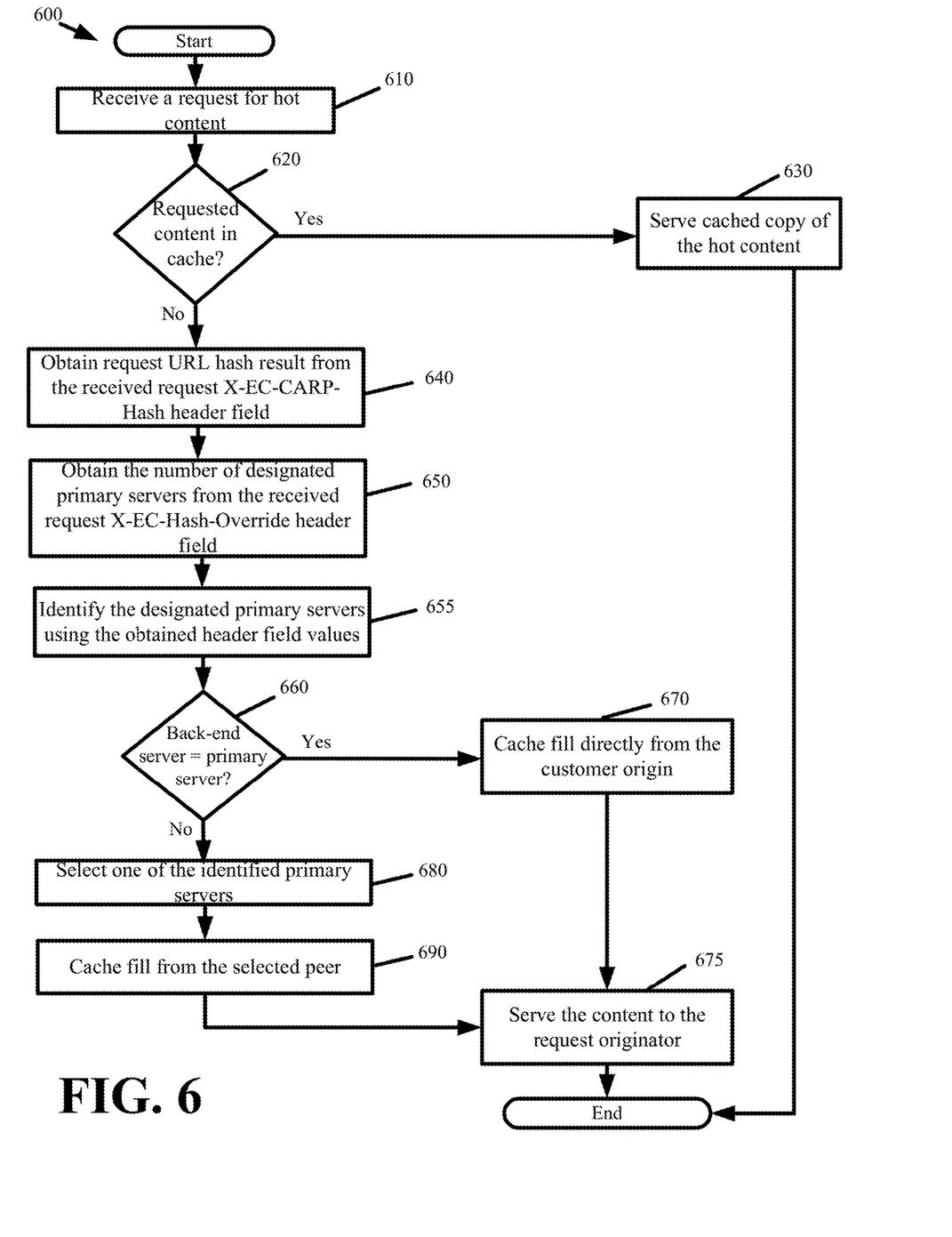
FIG. 6 presents a process for the peer cache fill operations performed by a back-end server in accordance with some embodiments.

FIG. 6 presents a process 600 for the peer cache fill operations performed by a back-end server in accordance with some embodiments. The process 600 commences when the back-end server receives (at 610) a request for hot content from a front-end server. The presence of the X-EC-Peer-Fill header field in the request header will indicate that the request is for hot content.

The process determines (at 620) if the requested hot content is in cache. If so, the process serves (at 630) the cached copy of the hot content and the process ends. Otherwise, the back-end server identifies the back-end server peers that have been designated as the primary servers for the implicated hot content. The back-end server performs a similar computation and ordering of the hot allocated servers as the front-end server in identifying the back-end server peers.

In particular, the process obtains (at 640) the request URI hash result from the received request X-EC-CARP-Hash header field and further obtains (at 650) the number of designated primary servers from the received request X-EC-Hash-Override header field. The process produces (at 650) its own ordered listing of the back-end servers based on a similar computation involving URI hash result that was used by the front-end server. The process then identifies (at 655) the designated primary servers as the first through X-EC-Hash-Override header field value identified back-end servers in the ordering. By including the hash result in the X-EC-CARP-Hash header field, the process avoids having the back-end server compute the same hash as the front-end server, even though the method by which the back-end server identifies the primary servers is similar to the method performed by the front-end server. As a result, there is less processing overhead on the back-end server and the back-end server can quickly produce the ordered listing of the back-end servers for identification of the designated primary servers. The back-end server executing process 600 then determines (at 660) if it is one of the designated primary servers.

In response to the back-end server executing process 600 identifying itself as a primary server for the hot content, the process cache fills (at 670) directly from the customer origin and, upon receipt of the content from the customer origin, the process serves (at 675) the content to the request originator. The process may optionally cache the content for distribution to subsequent users or other back-end servers.

If the back-end server executing process 600 is not designated as a primary server, the process selects (at 680) one of the identified primary servers. The selection can be based on a generated random number or through an alternate selection such as a round-robin selection. The process then cache fills (at 690) from the selected peer. In some embodiments, cache filling from the selected peer involves issuing a new request for the particular hot content directly to the selected peer or to the front-end servers which then forward the request to the selected peer. The back-end server may remove the X-EC-Peer-Fill header in issuing the request to the selected peer so that the selected peer directly responds to the request without performing the peer cache filling operations described herein. Here again, the process serves (at 675) the content to the request originator upon receipt from the back-end server peer. The process may optionally cache the content for subsequent redistribution.

The peer cache filling implementation can be quickly and dynamically escalated and deescalated in real-time in response to changing content hotness and changing request rates. Escalation involves dynamically allocating additional back-end servers to serve particular hot content by the front-end servers distributing requests for the particular hot content to a greater number of back-end servers as request counts for the particular hot content continue to increase past the set threshold(s). The back-end servers automatically perform the peer cache filling operations and temporarily operate as dynamically allocated hot content servers upon receipt of requests from the front-end servers containing the custom peer cache fill headers. Deescalation simply involves the front-end servers distributing requests for particular hot content across a shrinking number of back-end servers as request counts for the particular hot content decrease.

The peer cache filling of some embodiments can also be adapted and implemented across multiple caching tiers. For instance, a CDN may provide a first caching tier to respond to user requests and a second caching tier from which the first caching tier fills its cache, wherein the second caching tier cache fills directly from customer origins. The peer cache filling can be implemented at both the first caching tier and the second caching tier. Implementation at the first caching tier reduces cache fill load on the second caching tier, while implementation at the second caching tier reduces cache fill load of the customer origins.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
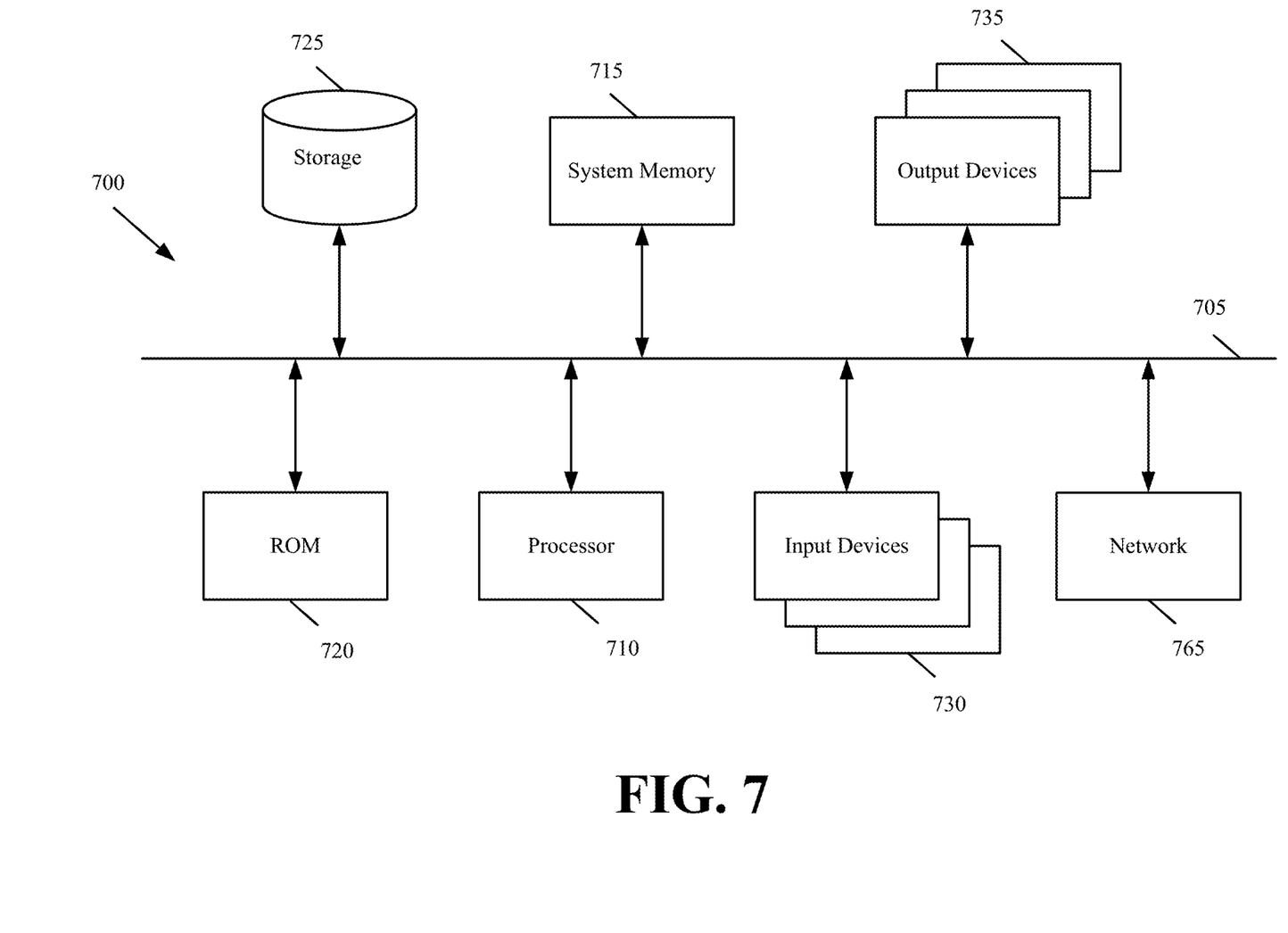
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., front-end server or back-end server). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments use a mass-storage device (such as a magnetic, solid-state, or optical disk) as the permanent storage device 725.

Other embodiments use a removable storage device (such as a flash drive) as the permanent storage device. Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   monitoring a rate at which particular content is requested from a distributed platform, the distributed platform comprising a plurality of servers at a common site;
   distributing each of a first set of requests, that is directed to the particular content to a first server of the plurality of servers in response to the rate not satisfying a threshold wherein the first server caches the particular content from an origin server that is outside the common site in response to the first server not having a cached copy of the particular content and in response to a header of at least one of the first set of requests omitting a peer identifier of another server of the plurality of servers;
   distributing a particular request, that is directed to the particular content, with a modified header to a different second server of the plurality of servers at the common site based on the rate satisfying the threshold, wherein the modified header comprises a peer identifier of the first server, and wherein presence of the peer identifier of the first server in the modified header of the particular request alters a cache fill operation of the second server by causing the second server to retrieve the particular content from the first server instead of the origin server or another server of the plurality of servers; and distributing a first subset of a second set of requests, that is directed to the particular content, to the first server, and a different second subset of the second set of requests to the second server in response to the rate satisfying the threshold.

2. The method of claim 1 further comprising:
receiving the second set of requests at a request director of the distributed platform;
determining that the rate immediately preceding the second set of requests satisfies the threshold; and
generating the modified header by inserting, into the header of each request of the second set of requests, the peer identifier of the first server.

3. The method of claim 1 further comprising:
determining that the particular content is not cached at the second server in response to receiving the particular request at the second server; and
retrieving the particular content from the first server to the second server in response to a peer retrieval of the particular content triggered by the peer identifier of the first server in the modified header of the particular request.

4. The method of claim 3, wherein said retrieving comprises:
issuing a request for the particular content from the second server to the first server in the common site; and
providing a copy of the particular content from a cache of the first server to the second server in response to said issuing.

5. The method of claim 1 further comprising:
retrieving, by the second server, the particular content from the origin server in response to the modified header of the particular request further comprising a peer identifier of the second server and further in response to determining that the particular content is not cached at the second server.

6. The method of claim 1 further comprising:
serving the particular content exclusively from the first server in response to each request of the first set of requests during a first time; and
serving the particular content from the first server in response to each request of the first subset of the second set of requests while contemporaneously serving the particular content from the second server in response to each request of the second subset of the second set of requests during a subsequent second time.

7. The method of claim 1 further comprising:
receiving the first set of requests during a first time;
serving the particular content exclusively from the first server in response to each request of the first set of requests during the first time;
receiving the second set of requests during a second time; and
serving the particular content from the first server in response to each request of the first subset of the second set of requests while contemporaneously serving the particular content to the second server in response to at least one request for the particular content during the second time.

8. The method of claim 1 further comprising:
adjusting a peer cache filling operation of the distributed platform based on said rate, wherein said adjusting comprises:
selecting the first server as a primary server to retrieve the particular content from the origin server and to respond to each of the first set of requests based on the rate not satisfying the threshold; and
selecting the first server as the primary server, the second server as a secondary server to retrieve the particular content from the first server, and the first server and the second server to respond to the second sets of requests based on the rate satisfying the threshold.

9. The method of claim 8, wherein selecting the first server as the primary server and the second server as the secondary server comprises:
modifying the header of each of the second set of requests with the peer identifier of the first server, wherein the peer identifier identifies the first server as the primary server for the particular content.

10. The method of claim 8, wherein said adjusting further comprises:
selecting the first server and the second server as primary servers, a third server of the plurality of servers as a secondary server to retrieve the particular content from either of the primary servers, and the first server, the second server, and the third servers to respond to different subsets of a third set of requests directed to the particular content in response to the rate satisfying the threshold and a larger second threshold; and
modifying the header of each of the third set of requests with the peer identifier of the first server, and a second peer identifier of the second server.

11. The method of claim 1 further comprising:
filling a cache of the first server with the particular content by retrieving and locally storing a copy of the particular content from the origin server; and
filling a cache of the second server with the particular content by retrieving and locally storing the copy of the particular content from the cache of the first server and without the second server accessing the origin server.

12. The method of claim 1, wherein said distributing first set of requests comprises distributing the first set of requests without modification, and wherein said distributing the second set of requests comprises distributing the second set of requests with the modified header comprising the peer identifier of the first server.

13. The method of claim 1 further comprising:
modifying a cache fill operation of the second server based on the rate, wherein modifying the cache fill operation comprises:
retrieving to the second server, the particular content from the first server in response to the rate satisfying the threshold and not satisfying a different larger second threshold; and
retrieving to the second server, the particular content directly from the origin server in response to the rate satisfying the threshold and the larger second threshold.

14. The method of claim 1 further comprising:
selecting the first server in response to hashing a Uniform Request Identifier (URI) of each of the first set of requests and further in response to the rate not satisfying the threshold; and selecting between the first server and the second server in response to hashing the URI of each of the second set of requests and further in response to the rate satisfying the threshold.

15. The method of claim 1 further comprising:
generating an ordered listing of the plurality of servers;
selecting a set of servers from the ordered listing based on the rate, wherein the set of servers comprises one or more earliest listed servers in the ordered listing as servers for responding to requests directed to the particular content based on the rate, and wherein a number of servers in the set of servers is determined based on said rate satisfying one or more thresholds; and
selecting a first subset of the set of servers as primary servers that retrieve the particular content from the origin server, and another second subset of the set of servers as secondary servers that retrieve the particular content from the first subset of servers, and wherein a number of servers in the first subset of servers is a percentage or fraction of the number of servers in the set of servers.

16. A device comprising:
a non-transitory computer-readable medium storing a set of processor-executable instructions; and
one or more processors configured to execute the set of processor-executable instructions, wherein executing the set of processor-executable instructions causes the one or more processors to:
  monitor a rate at which particular content is requested from a distributed platform, the distributed platform comprising a plurality of servers at a common site;
  distribute each of a first set of requests, that is directed to the particular content, to a first server of the plurality of servers in response to the rate not satisfying a threshold, wherein the first server caches the particular content from an origin server that is outside the common site in response to the first server not having a cached copy of the particular content and in response to a header of at least one of the first set of requests omitting a peer identifier of another server of the plurality of servers;
  distribute a particular request, that is directed to the particular content, with a modified header to a different second server of the plurality of servers at the common site based on the rate satisfying the threshold, wherein the modified header comprises a peer identifier of the first server, and wherein presence of the peer identifier of the first server in the modified header of the particular request alters a cache fill operation of the second server by causing the second server to retrieve the particular content from the first server instead of the origin server or another server of the plurality of servers; and
  distribute a first subset of a second set of requests, that is directed to the particular content, to the first server, and a different second subset of the second set of requests to the second server of the plurality of servers in response to the rate satisfying the threshold.

17. The device of claim 16, wherein the processor-executable instructions further include processor-executable instructions to:
  receive the second set of requests at a request director of the distributed platform;
  determine that the rate immediately preceding the second set of requests satisfies the threshold; and
  generate the modified header by inserting, into the header of each request of the second set of requests, the peer identifier of the first server.

18. The device of claim 16, wherein the processor-executable instructions further include processor-executable instructions to:
  determine that the particular content is not cached at the second server in response to receiving the particular request; and
  retrieve the particular content from the first server to the second server in response to a peer retrieval of the particular content triggered by the peer identifier of the first server in the modified header of the particular request.

19. The device of claim 16, wherein the processor-executable instructions further include processor-executable instructions to:
  serve the particular content exclusively from the first server in response to each request of the first set of requests during a first time; and
  serve the particular content from the first server in response to each request of the first subset of the second set of requests while contemporaneously serving the particular content from the second server in response to each request of the second subset of the second set of requests during a subsequent second time.

20. A non-transitory computer-readable medium, storing a set of processor-executable instructions, which, when executed by one or more processors, cause the one or more processors to:
  monitor a rate at which particular content is requested from a distributed platform, the distributed platform comprising a plurality of servers at a common site;
  distribute each of a first set of requests, that is directed to the particular content, to a first server of the plurality of servers in response to the rate not satisfying a threshold, wherein the first server caches the particular content from an origin server that is outside the common site in response to the first server not having a cached copy of the particular content and in response to a header of at least one of the first set of requests omitting a peer identifier of another server of the plurality of servers;
  distribute a particular request, that is directed to the particular content, with a modified header to a different second server of the plurality of servers at the common site based on the rate satisfying the threshold, wherein the modified header comprises a peer identifier of the first server, and wherein presence of the peer identifier of the first server in the modified header of the particular request alters a cache fill operation of the second server by causing the second server to retrieve the particular content from the first server instead of the origin server or another server of the plurality of servers; and
  distribute a first subset of a second set of requests, that is directed to the particular content to the first server, and a different second subset of the second set of requests to the second server of the plurality of servers in response to the rate satisfying the threshold.

* * * * *